United States Patent
Gupta et al.

(10) Patent No.: US 7,621,646 B2
(45) Date of Patent: Nov. 24, 2009

(54) CURVED BAND-PASS FILTER

(75) Inventors: Anurag Gupta, Tucson, AZ (US); Scott A. Lerner, Corvallis, OR (US)

(73) Assignee: Hewlett-Packard Development Company, Houston, TX (US)

( * ) Notice: Subject to any disclaimer, the term of this patent is extended or adjusted under 35 U.S.C. 154(b) by 547 days.

(21) Appl. No.: 11/481,328

(22) Filed: Jul. 5, 2006

(65) Prior Publication Data

US 2008/0007698 A1 Jan. 10, 2008

(51) Int. Cl.
*G03B 21/14* (2006.01)
*G03B 21/18* (2006.01)
*G03B 21/26* (2006.01)
*F21V 9/00* (2006.01)
*F21V 11/00* (2006.01)
*F21L 19/00* (2006.01)
*A01M 1/04* (2006.01)

(52) U.S. Cl. ............ 353/84; 353/55; 362/166; 362/293; 362/510

(58) Field of Classification Search .......... 353/20, 353/69, 77, 84; 362/2, 293, 166, 510; 348/342, 348/786; 359/308, 337–337.1, 359, 498, 359/723, 885, 892
See application file for complete search history.

(56) References Cited

U.S. PATENT DOCUMENTS

| | | | |
|---|---|---|---|
| 3,427,447 A | 2/1969 | Clark | |
| 3,455,622 A | 7/1969 | Cooper | |
| 3,457,401 A * | 7/1969 | Hoekstra | 362/263 |
| 4,095,881 A | 6/1978 | Maddox | |
| 4,315,186 A | 2/1982 | Hirano et al. | |
| 4,386,292 A | 5/1983 | Rothwell et al. | |
| 4,766,526 A | 8/1988 | Morimoto et al. | |
| 4,839,553 A | 6/1989 | Mellor | |
| 5,016,152 A | 5/1991 | Awai et al. | |
| 5,373,423 A * | 12/1994 | Liedtke et al. | 362/510 |
| 5,574,328 A | 11/1996 | Okuchi | |
| 5,889,581 A | 3/1999 | Tokuda | |
| 6,114,807 A * | 9/2000 | Kavanagh | 313/570 |
| 6,351,295 B2 | 2/2002 | Kakuda et al. | |
| 6,404,112 B1 * | 6/2002 | Frings et al. | 313/113 |
| 6,437,909 B1 * | 8/2002 | Okamori et al. | 359/361 |
| 6,639,652 B1 | 10/2003 | Mori et al. | |
| 6,812,979 B2 * | 11/2004 | Um | 349/106 |
| 6,827,473 B2 * | 12/2004 | Kobayashi | 362/510 |
| 6,854,848 B2 * | 2/2005 | Fujimori et al. | 353/20 |
| 6,935,745 B1 * | 8/2005 | Kitabayashi et al. | 353/20 |
| 7,153,011 B2 * | 12/2006 | Shen et al. | 362/510 |
| 7,188,973 B2 * | 3/2007 | Katsuma | 362/293 |
| 7,196,842 B2 * | 3/2007 | Weigl et al. | 359/361 |
| 7,358,657 B2 * | 4/2008 | Koelger et al. | 313/113 |
| 7,380,962 B2 * | 6/2008 | Chaves et al. | 362/293 |
| 7,497,594 B2 * | 3/2009 | Nagarekawa et al. | 362/268 |
| 2005/0105176 A1 | 5/2005 | Lippey et al. | |
| 2005/0286024 A1 | 12/2005 | Gupta | |
| 2006/0018125 A1 | 1/2006 | Miller et al. | |

FOREIGN PATENT DOCUMENTS

DE  10256271 A1 *  6/2004

* cited by examiner

*Primary Examiner*—Diane I Lee
*Assistant Examiner*—Jori S Byrne-Diakun

(57) ABSTRACT

An apparatus includes an electromagnetic radiation source, a reflector about the source having an aperture and a curved band pass filter at least partially across the aperture.

25 Claims, 4 Drawing Sheets

CURVED BAND-PASS FILTER

BACKGROUND

Illumination systems and other devices may utilize a lamp as a source of light. In some applications, the light is filtered to attenuate undesirable wavelengths of light such as infrared light and ultraviolet light. The filtering of such light may be inefficient or may lessen the intensity or brightness of the desired wavelengths of light emitted by the lamp.

DETAILED DESCRIPTION OF THE EXAMPLE EMBODIMENTS

Figure 1:
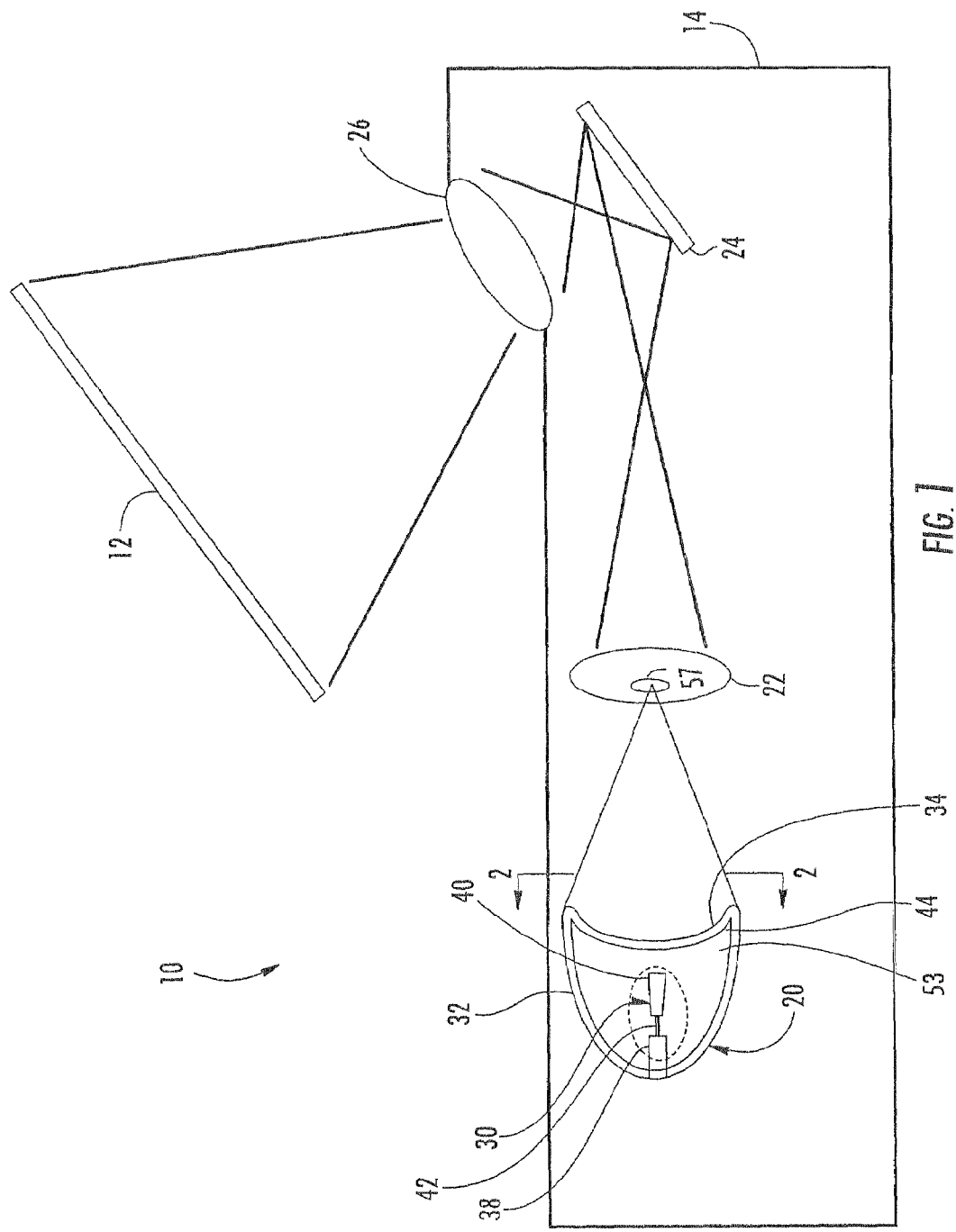
FIG. 1 is a schematic illustration of one example of a projection system including one example of a lamp according to one example embodiment.

FIG. 1 schematically illustrates one example embodiment of a projection system 10. As will be described hereafter, projection system 10 employs a lamp that effectively filters undesirable wavelengths of light using a curved filter. Projection system 10 generally includes screen 12 and projector 14. Screen 12 constitutes a structure configured to reflect light projected upon it by projector 14. In one embodiment, screen 12 may be passive in that screen 12 has a predetermined reflectivity. In other embodiments, screen 12 may be active having one or more portions that may have selectively adjustable reflectivities.

Projector 14 constitutes a device configured to project light upon screen 12. Projector 14 generally includes arc lamp 20, condenser 22, optical modulator 24 and projection lens 26. Arc lamp 20 serves as a light source for projection system 10. Lamp 20 provides visible light for system 10 in an efficient manner while efficiently filtering and absorbing other selected wavelengths of light such as infrared light and ultraviolet light. Lamp 20 generally includes burner 30, reflector 32 and filter 34. Burner 30 comprises that portion of lamp 20 configured to generate light including visible light. Burner 30 generally includes a pair of electrodes 38, 40 separated by an arc gap 42 and a rare gas under pressure at least within the arc gap 42. Application of appropriate voltages to electrodes 40 and 42 creates an electrical arc across arc gap 42 and through the gas, resulting in the generation of light.

According to one embodiment, burner 30 comprises a short arc lamp. In one embodiment, arc gap 42 is filled with pressurized xenon gas. This pressurized gas is sealed by filter 34 within reflector 32. In other embodiments, burner 30 may have other configurations. For example, in lieu of xenon gas, burner 30 may alternatively include a Mercury gas. In yet other embodiments, burner 30 may comprise a metal-halide burner.

Reflector 32 comprises a structure at least partially about burner 30 and configured to reflect light emitted by burner 30. In one embodiment, reflector 32 is elliptical. In other embodiments, the inner shape of the reflector can be other shapes such as parabolic, spherical, and cylindrical or an asphere. In the example illustrated, reflector 32 is additionally configured to at least partially absorb selected wavelengths of light such as infrared and ultraviolet wavelengths of light. Reflector 32 (in case of an elliptical reflector) focuses light generated by burner 30 through filter 34 at a predetermined focal plane 57.

Filter 34 (sometimes referred to as a window) comprises a curved structure of one or more layers of materials configured to filter selected wavelengths of light generated by burner 30 and reflected by reflector 32 such that desired wavelengths of light pass-through filter 34. In the embodiment illustrated, filter 34 is configured to permit visible light to pass while blocking and reflecting ultraviolet light and infrared light.

Figure 2:
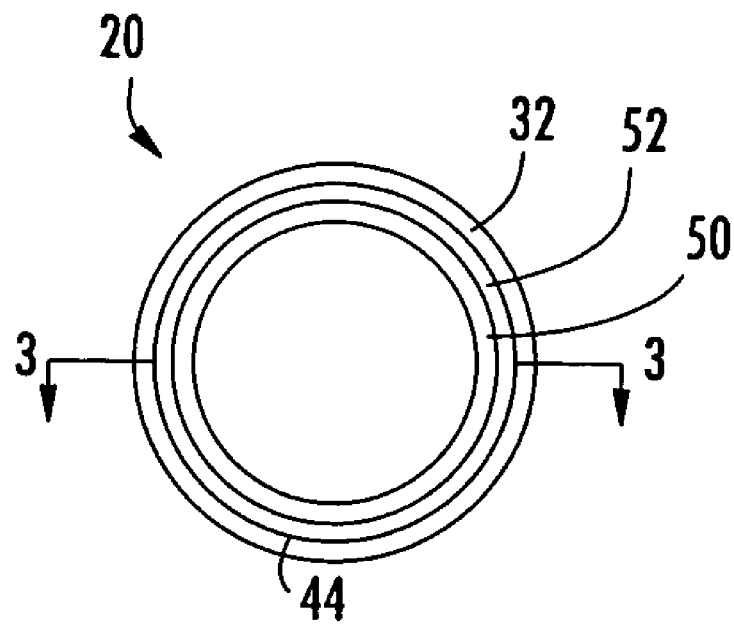
FIG. 2 is a front elevational view of the lamp of FIG. 1 taken a long line 2-2 according to an example embodiment.
Figure 3:
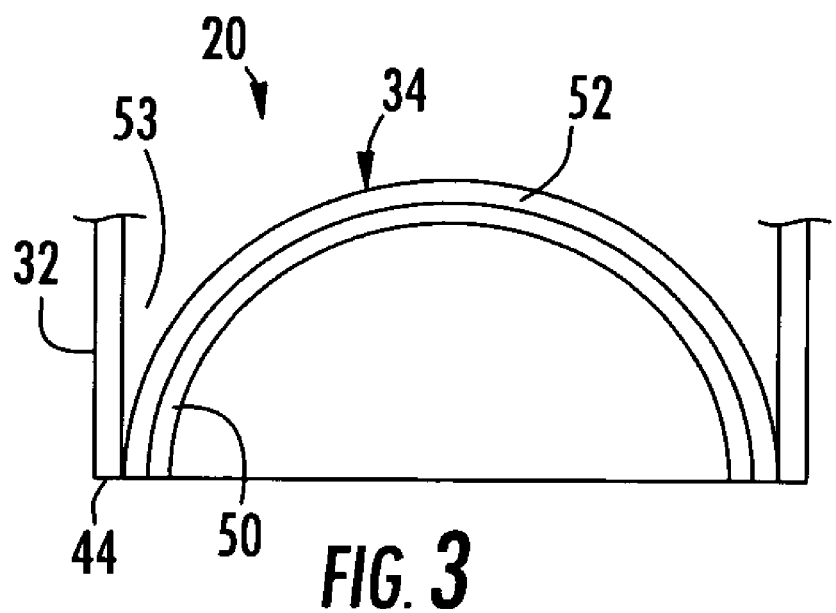
FIG. 3 is a fragmentary sectional view of the lamp of FIG. 2 taken along line 3-3 according to an example embodiment.

FIGS. 2 and 3 illustrate filter 34 in more detail. As shown by FIGS. 2 and 3, filter 34 has a substantially uniform thickness and spans or extends across opening 44 of reflector 32. In the particular example illustrated, filter 34 includes a substrate or support layer 50 and a filter layer 52. Support layer 50 comprises a substantially uniform layer of transparent material of sufficient strength and rigidity so as to support layer 52. In one embodiment, layer 50 comprises sapphire or glass. In other embodiments, other transparent materials may be employed.

Layer 52 comprises a substantially uniform layer or layers of one or more materials configured to permit selected wavelengths of light to pass through layer 52 and configured to reflect or otherwise attenuate transmission of other selected wavelengths. In the embodiment illustrated, layer 52 is configured to substantially permit transmission of visible light while attenuating and reflecting ultraviolet light and infrared light. In the embodiment illustrated, layer 52 extends on an inner side of layer 50, closest to burner 30 (shown in FIG. 1). As a result, contact with layer 52 which may result in scratches or other damage to layer 52 may be reduced or prevented. In other embodiments, layer 52 may alternatively be formed on an outer side of support layer 50. In yet other embodiments, layer 52 can be divided into two parts, with one part on the inner side of layer 52 and the other part on the outer side.

In the example illustrated, layer 52 comprises a thin film interference coating formed upon support layer 50. Examples of thin film interference coatings include metal layers such as chromium or nickel, dielectric layers such as $SiO_2$, $TiO_2$ or mixtures thereof. In other embodiments, layer 52 may be far from other materials as well.

Although enlarged for purposes of illustration, layer 52 is proportionally thin as compared to layer 50. In one embodiment, layer 52 as a thickness of between about 1 mm and 10 mm, and nominally about 5 mm. In one embodiment, layer 52 is spin coated or deposited via sputtering or evaporation upon support layer 50. In other embodiments, layer 52 may be formed upon support layer 52 in other fashions or may be supported relative to reflector 32 by other structures.

As shown by FIG. 3, filter 34 has a curved cross-sectional shape with a convex side of filter 34 facing an interior 53 of reflector 32. In the embodiment illustrated, filter 34 has a semi-spherical shape. In other embodiments, filter 34 may have an aspherical surface profile.

Figure 4:
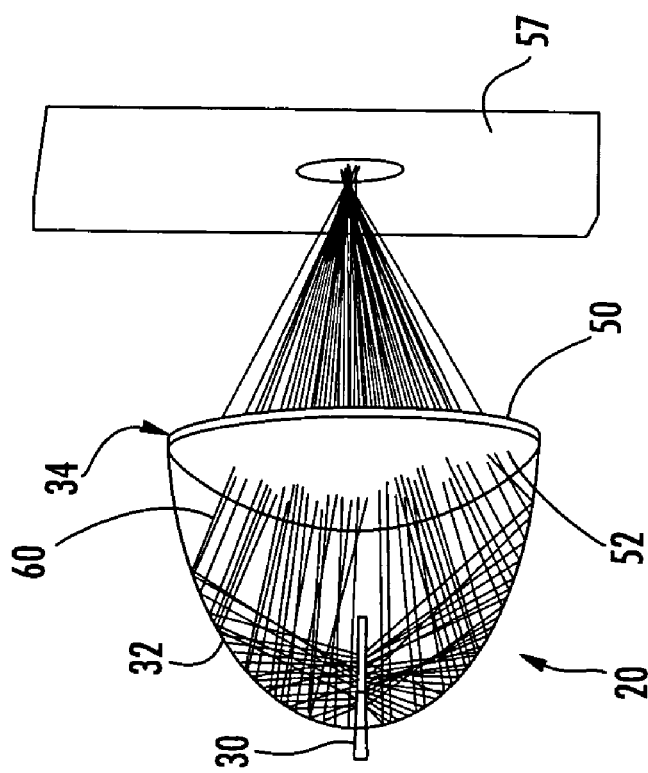
FIG. 4 is a perspective view illustrating emission of light by a burner of the lamp of FIG. 1 with a reflector of the lamp being shown as transparent for purposes of illustration according to an example embodiment.

Because filter 34 is curved in shape, filter 34 enhances the light emitting and filtering efficiency of lamp 20. FIGS. 2 and 3 illustrate reflection and filtering of light by filter 34. In particular, FIG. 4 illustrates light rays 60 emanating from the source, burner 30. As shown by FIG. 4, rays 60 reflect off of reflector 32 and impinge filter 34 at various angles. Rays 60 may include ultraviolet and infrared wavelengths of light in addition to visible wavelength of light. In the embodiment illustrated, reflector 32 is configured to absorb a portion of the ultraviolet and infrared wavelengths of light, while at least substantially reflecting visible wavelength of light towards filter 34 and towards a focal plane 57. Ultraviolet and infrared wavelengths of light that are not absorbed by reflector 32 during an initial impingement with reflector 32 are also reflected towards filter 34.

Filter 34 filters or separates desired wavelengths of light, visible light, from undesirable wavelengths of light, infrared and ultraviolet light. Filter 34 transmits a greater portion of visible light as compared to infrared or ultraviolet light. Likewise, filter 34 attenuates the transmission of or reflects a greater portion of the ultraviolet and infrared wavelengths of light as compared to visible light. Such filtering is largely achieved by layer 52 (shown in FIG. 3) deposited on layer 50. The ability of filter 34 to filter ultraviolet and infrared light from visible wavelengths of light may vary depending upon an angle of incidence of such light with respect to filter 34. Because filter 34 is curved, the overall range of incident angles between rays 60 and normal to the layer 52 of filter 34 is reduced. As a result, the composition of layer 52 may be more finely tuned to the narrower range of incident angles so as to better filter undesirable wavelengths of light from desirable wavelengths of light. For example, if filter 34 were flat or planar, layer 52 upon filter 34 would potentially have to filter light impinging such a filter across a broader range of incident angles. To address such a broader range of incident angles, the composition of layer 52 may have to be more generic, reducing the percentage of ultraviolet or infrared light that such a filter 34 could filter. In contrast, because filter 34 is curved, the composition of layer 52 does not need to address such a large range of incident angles, enabling the composition of layer 52 to be more focused for the reduced range of incident angles so as to more effectively filter ultraviolet and infrared light and transmit more of visible light as well.

Figure 5:
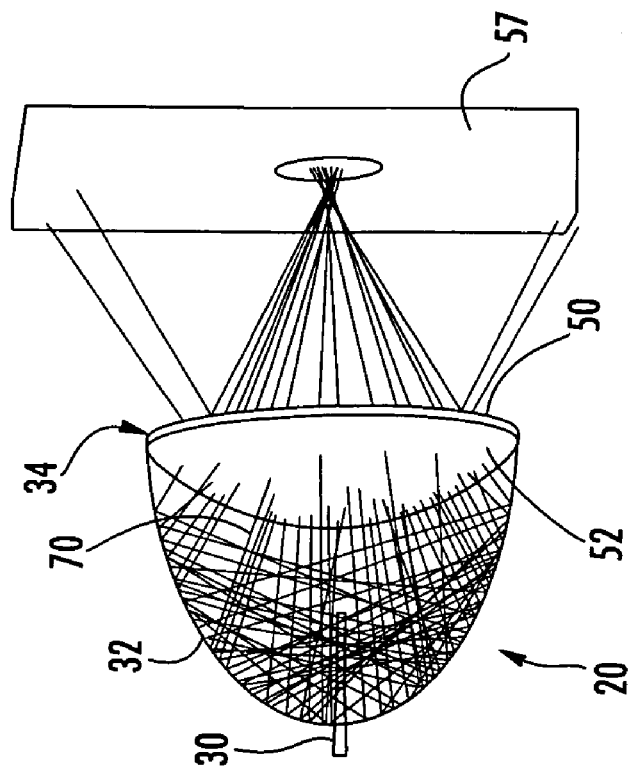
FIG. 5 is a perspective view illustrating reflection of light within the lamp of FIG. 1 with the reflector of the lamp being shown as transparent for purposes of illustration according to an example embodiment.

FIG. 5 illustrates rays 70 of light which have not been permitted to pass through filter 34 during initial impingement with filter 34 and which are being reflected by filter 34. Such rays 70 may include infrared wavelength light, ultraviolet wavelengths of light and visible wavelengths of light. As shown by FIG. 5, such reflected rays 70 once again impinge reflector 32. As a result, reflector 32 once again absorbs a percentage or portion of undesirable wavelengths of light, such as infrared or ultraviolet wavelengths of light while once again reflecting visible wavelengths of light. The visible wavelengths of light and the ultraviolet and infrared wavelengths of light not yet absorbed by reflector 32 are once again reflected and directed towards reflector 32, where reflector 32 once again filters such light. This cycle is repeated.

Because filter 34 is curved, reflector 32 is provided with more opportunities (multiple impingements) to absorb the infrared and ultraviolet wavelengths of light and filter 34 is provided with more opportunities (multiple impingements) to filter or attenuate the transmission of ultraviolet and infrared light all permitting visible light to pass through filter 34 to the focal plane 57. As compared to a flat or planar filter which may reflect such light toward burner 30, potentially reducing the extent to which such light impinges reflector 32 and is absorbed by reflector 32, filter 34, which is curved, reflects a greater percentage of light towards reflector 32, increasing the number of times that light may impinge reflector 32 for absorption of ultraviolet and infrared light and increasing the number of times that light may impinge filter 34 for filtering of infrared and ultraviolet light and transmission of visible light to focal plane 57.

As further shown by FIG. 5, in the embodiment illustrated, filter 34 is provided with an appropriate curvature with respect to reflector 32 such that light reflected by filter 34 and reflected by reflector 32 passes through arc gap 42 rather than heating up the electrodes 38, 40 as in the case of a flat filter. Because such reflected light passes through arc gap 42, plasma in arc gap 42 is heated, resulting in enhanced light emission. In other embodiments, reflector 32 may have other curvatures.

In addition to enhancing light emission and filtering efficiency of lamp 20, filter 34 also may increase structural integrity of lamp 20. Because filter 34 is curved, filter 34 offers increased mechanical strength, permitting the thickness of filter 34 and, in particular, layer 50, to be reduced, reducing cost. Because of its increased mechanical strength across opening 44 of reflector 32, filter 34 may be more adept for sealing the gases of lamp 20 within interior 53 of reflector 32. However, as indicated by broken lines in FIG. 1, in some embodiments, lamp 20 may additionally include a transparent bulb about burner 30 to seal such gases. In such an alternative embodiment, filter 34 may not provide such a sealing function.

Visible light passing through filter 34 and emitted by lamp 20 impinges focal plane 57 (shown in FIG. 4). In the particular embodiment illustrated in FIG. 1 in which lamp 20 is employed as part of projection system 10, such visible like impinges condenser 22. Condenser 22 constitutes one or more optical devices, such as lenses, configured to image light from lamp 20 onto optical modulator 24. In one embodiment, condenser 22 may include one or more refractive or reflective components. Lamp 20 and condenser 22, together, serve as an illumination system for optical modulator 24.

Optical modulator 24 selectively modulates light imaged upon it so as to form an image of light that is projected to screen 12 by lens 26. Although optical modulator 24 is illustrated as being reflective, in other embodiments, optical modulator 24 may be transmissive. Examples of optical modulator 24 include digital micro mirror devices (DMDs), liquid crystal devices (LCDs), liquid crystal on silicon (LCos) devices or Fabry-Perot interferometric devices. In particular embodiments, projector 14 may include greater than one optical modulator.

Projection lens 26 images light from the one or more optical modulators 24 onto screen 12. Projection lens 26 may include one or more refractive or reflective components. Because filter 34 provides lamp 20 with improved filtering and emission efficiency, the image projected onto screen 12 may be brighter and have improved quality.

Figure 6:
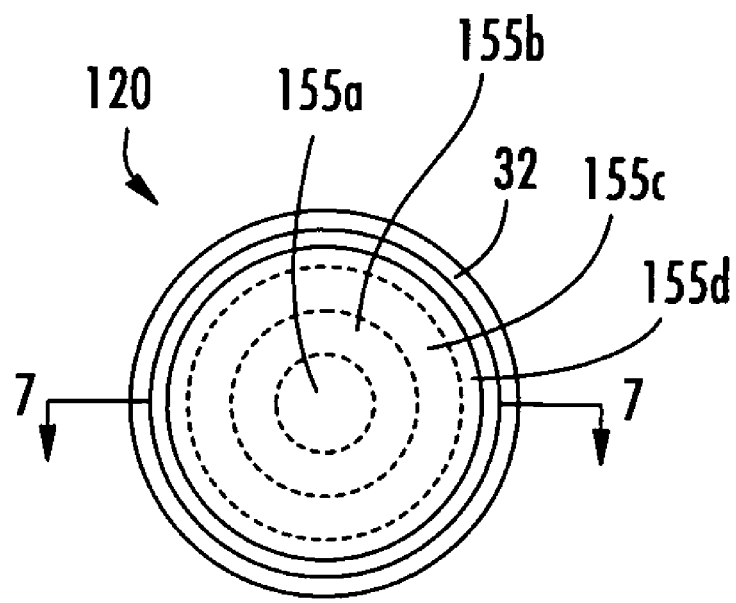
FIG. 6 is a front elevational view of another embodiment of the lamp of FIG. 2 according to an example embodiment.
Figure 7:
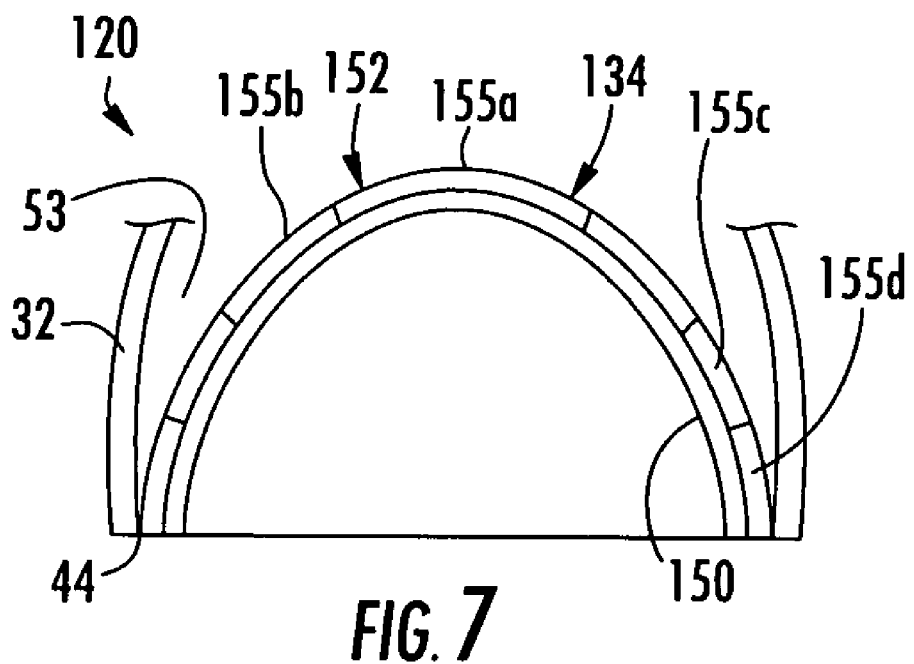
FIG. 7 is a fragmentary sectional view of the lamp of FIG. 6 taken along line 7-7 according to an example embodiment.

FIGS. 6 and 7 illustrate lamp 120, another embodiment of lamp 20 (shown in FIGS. 1-5). Lamp 120 is similar to lamp 20 except at lamp 120 includes filter 134 in lieu of filter 34. Those remaining components of lamp 120 are the same as the components of lamp 20. Although not illustrated in FIGS. 6 and 7, lamp 120 includes burner 30 (shown in FIG. 1).

Like filter 34, filter 134 is curved in shape. However, as shown by FIG. 7, filter 134 has an aspherical shape. Filter 134 includes support layer 150 and filter layer 152. Support layer 150 is similar to support layer 50 except that support layer 150 has an aspherical shape. Like support layer 50, support layer 150 extends across opening 44 of reflector 32 and is formed from a transparent material such as glass or sapphire. In other embodiments, support layer 150 may have other shapes and may be formed from other optically transparent materials.

Filter layer 152 comprises one or more layers of one or more materials formed upon support layer 150 and configured to filter undesirable wavelengths of light so as to block or attenuate transmission of such undesirable wavelengths of light while permitting a greater percentage of desirable wavelengths of light to pass there through. In the particular example illustrated, filter layer 152 is configured to attenuate transmission of ultraviolet and infrared wavelengths of light while permitting visible wavelengths of light to pass. In the example illustrated, layer 152 comprises a thin film interference coating formed upon support layer 150. Examples of thin film interference coatings include metal layers such as chromium or nickel, dielectric layers such as SiO2, TiO2 or mixtures thereof. In other embodiments, layer 52 may be far from other materials as well. In the example illustrated, layer 152 is formed upon an inner side of support layer 150 closest to interior 53 of reflector 32 such a physical contact with layer 152 is inhibited to reduce the likelihood of scratches or other damage to layer 152.

As further shown by FIGS. 6 and 7, filter layer 152 includes portions 155a, 155b, 155c and 155d (collectively referred to as portions 155). Portions 155 are each distinct portions of layer 152 configured to differently filter light. In particular, each of portions 155 of layer 152 is configured to achieve enhanced light filtering for a particular different range of incident angles that light may impinge the portion 155. In one embodiment, one or more of portions 155 is provided with a distinctive thickness such that light is differently filtered by such portions 155 depending upon its angle of incidence with the particular portion 155. In other embodiments, one or more portions 155 may have different compositions. Because layer 152 includes distinct portions 155, each portion 155 may be a fine tuned for filtering undesirable wavelengths of light, such as ultraviolet light and infrared light, which impinge the particular portion 155 at an incident angle within an expected smaller range of incident angles. For example, light impinging portion 155a may be expected to have a greater incident angle as compared to light impinging portion 155c. As a result, the thickness or composition of portion 155a may be different than the thickness or composition of portion 155c to enable portion 155a to better filter light with such larger incident angles and the thickness or composition of portion 155c may be provided with an appropriate thickness or composition best suited for filtering light having smaller incident angles with filters 134. As a result, the overall emission and filtering efficiency of filter 134 is enhanced.

In the particular embodiments illustrated in FIGS. 6 and 7, portion 155a comprises a circular area and portions 155b-155d comprise annular rings about portion 155a. In other embodiments, portions 155 may have different shapes or relative locations. Although layer 152 is illustrated as having four distinct portions 155, in other embodiments, layer 152 may have greater or fewer of such portions 155. Although portions 155 or illustrated as having distinct or sharp boundaries there between, in other embodiments, portions 155 may have gradual transitions between such portions. Although layer 152 is illustrated as being employed with filter 134 having an aspherical shape, layer 152 may alternatively be employed in a filter having a spherical shape, such as filter 34.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
an electromagnetic radiation source;
a reflector about the source having an aperture; and
a curved band pass filter completely extending across the aperture, wherein the reflector has a concave surface facing the source and wherein the curved band pass filter has a convex surface facing the concave surface of the reflector.

2. The apparatus of claim 1, wherein the filter seals an interior of the reflector.

3. The apparatus of claim 2 further comprising a pressurized gas sealed within the interior by the reflector.

4. The apparatus of claim 1, wherein the electromagnetic radiation source is selected from a group of sources consisting of: a Mercury based burner, a xenon based burner and a metal-halide burner.

5. The apparatus of claim 1, wherein the filter is spherical.

6. The apparatus of claim 1, wherein the filter is aspherical.

7. The apparatus of claim 1, wherein the filter comprises:
a curved substrate having a convex surface facing the reflector; and
a first coating upon the substrate, the first coating configured to filter predetermined wavelengths of electromagnetic radiation, wherein the first coating has a first side in contact with the convex surface and a second side opposite the first side and facing the reflector.

8. The apparatus of claim 7, wherein the first coating is on a first portion of the substrate and wherein the filter further comprises a second coating upon a second portion of the substrate.

9. The apparatus of claim 8, wherein the first portion comprises a first ring and the second portion comprises a second ring.

10. The apparatus of claim 8, wherein the first coating is configured to filter predetermined wavelengths of electromagnetic radiation differently than the second coating based upon incident angles of the electromagnetic radiation.

11. The apparatus of claim 8, wherein the first coating and the second coating have different thicknesses.

12. The apparatus of claim 11, wherein the first coating has a first thickness and wherein the second coating is radially outward the first coating and has a second thickness greater than the first thickness.

13. The apparatus of claim 7, wherein the first coating comprises a thin film interference coating.

14. The apparatus of claim 1 further comprising a light modulator.

15. An apparatus comprising:
a substrate;
a first coating upon a first portion of the substrate; and
a second coating upon a second portion of the substrate, wherein the first coating is configured to filter predetermined wavelengths of electromagnetic radiation differently than the second coating based upon incident angles of the electromagnetic radiation.

16. The apparatus of claim 15, wherein the substrate is curved.

17. The apparatus of claim 15, wherein the first portion comprises a first ring and the second portion comprises a second ring.

18. The apparatus of claim 11, wherein of the first coating and a second coating have different thicknesses.

19. A method comprising:
emitting electromagnetic radiation from a source within a reflector having an aperture;
filtering predetermined wavelengths of electromagnetic radiation with a filter having a convex surface facing the source and completely extending across the aperture; and
reducing a range of incident angles of the electromagnetic radiation at the filter.

20. The apparatus of claim 15, wherein the substrate is configured to transmit visible light.

21. The method of claim 19, wherein reducing a range of incident angles of the electromagnetic radiation at the filter comprises reducing a range of incident angles of electromagnetic radiation incident upon the filter.

22. An apparatus comprising:
an electromagnetic radiation source;
a reflector about the source having an aperture; and
a curved band pass filter at least partially across the aperture, wherein the filter comprises:
a curved substrate; and
a first coating upon the substrate, the first coating configured to filter predetermined wavelengths of electromagnetic radiation, wherein the first coating is on a first portion of the substrate and wherein the filter further comprises a second coating upon a second portion of the substrate.

23. The apparatus of claim 22, wherein the first portion comprises a first ring and the second portion comprises a second ring.

24. The apparatus of claim 22, wherein the first coating is configured to filter predetermined wavelengths of electromagnetic radiation differently than the second coating based upon incident angles of the electromagnetic radiation.

25. The apparatus of claim 1, wherein the filter has a concave surface facing away from the convex surface.

* * * * *

UNITED STATES PATENT AND TRADEMARK OFFICE
CERTIFICATE OF CORRECTION

| | | |
|---|---|---|
| PATENT NO. | : 7,621,646 B2 | Page 1 of 1 |
| APPLICATION NO. | : 11/481328 | |
| DATED | : November 24, 2009 | |
| INVENTOR(S) | : Anurag Gupta et al. | |

It is certified that error appears in the above-identified patent and that said Letters Patent is hereby corrected as shown below:

In column 7, line 6, in Claim 18, after "wherein" delete "of".

In column 7, line 7, in Claim 18, delete "a" and insert -- the --, therefor.

Signed and Sealed this

Sixth Day of April, 2010

David J. Kappos
*Director of the United States Patent and Trademark Office*